US006312636B1

(12) United States Patent
McFarland et al.

(10) Patent No.: US 6,312,636 B1
(45) Date of Patent: Nov. 6, 2001

(54) METHOD FOR ELECTROMAGNETIC ACTUATOR WITH MOLDED CONNECTOR

(75) Inventors: Robert W. McFarland, Newport News; Dennis Bulgatz, Williamsburg, both of VA (US)

(73) Assignee: Siemens Automotive Corporation, Auburn Hills, MI (US)

( * ) Notice: Subject to any disclaimer, the term of this patent is extended or adjusted under 35 U.S.C. 154(b) by 0 days.

(21) Appl. No.: 09/270,414

(22) Filed: Mar. 16, 1999

Related U.S. Application Data

(60) Provisional application No. 60/090,888, filed on Jun. 26, 1998, now abandoned.

(51) Int. Cl.[7] .......................... B29C 70/70; B29C 70/78

(52) U.S. Cl. .......................... 264/267; 264/273; 264/274; 264/272.19

(58) Field of Search .......................... 264/259, 261, 264/263, 267, 268, 271.1, 273, 274, 272.19; 156/293, 295, 303.1; 29/602.1; 335/106, 132, 133

(56) References Cited

U.S. PATENT DOCUMENTS

| | | | | |
|---|---|---|---|---|
| 2,568,274 | | 9/1951 | Clark | 18/59 |
| 3,520,990 | | 7/1970 | Boersma | 174/163 |
| 3,601,735 | * | 8/1971 | Bercovici | 336/96 |
| 4,109,224 | * | 8/1978 | Liautaud | 336/192 |
| 4,160,381 | | 7/1979 | Jackman | 73/322.5 |
| 4,336,948 | | 6/1982 | Couture | 280/11.12 |
| 4,405,912 | * | 9/1983 | Palma et al. | 335/260 |
| 4,535,827 | | 8/1985 | Seaford | 152/7 |
| 4,683,097 | | 7/1987 | Hand et al. | 264/268 |
| 4,879,794 | | 11/1989 | Djerf | 29/159.1 |
| 5,053,178 | | 10/1991 | Butlin et al. | 264/254 |
| 5,075,066 | | 12/1991 | Tereda et al. | 264/247 |
| 5,158,509 | | 10/1992 | Ebaugh et al. | 244/3.24 |
| 5,331,730 | * | 7/1994 | Brinn, Jr. | 29/606 |
| 5,423,117 | * | 6/1995 | Okada et al. | 29/605 |
| 5,609,433 | | 3/1997 | Pazdirek et al. | 403/140 |
| 5,617,890 | | 4/1997 | Brehm et al. | 137/82 |
| 5,695,705 | | 12/1997 | Halket et al. | 264/277 |
| 5,871,681 | * | 2/1999 | Karino et al. | 264/272.15 |
| 6,103,157 | * | 8/2000 | Behm et al. | 264/102 |

FOREIGN PATENT DOCUMENTS 297 12 502 U1 10/1997 (DE) .

* cited by examiner

*Primary Examiner*—Angela Ortiz

(57) ABSTRACT

A method of joining a connector 12 to an electromagnetic actuator 10 is provided. The actuator 10 has a metal housing structure 14, 18 and electrical leads 24, 26 extending from the housing structure. The method includes providing at least one channel 30 in the housing structure and a port 36 communicating with the at least one channel 30 and with a mounting surface 28 of the housing structure. The plastic connector 12 is molded on the mounting surface 28 and plastic material in fluid form is permitted to flow through the port 36 and into the at least one channel 30 to fill the channel and the port. The plastic material is permitted to cool and harden to define the connector 12 with the connector being interlocked with respect to the housing structure via the plastic material in the at least one channel 30.

6 Claims, 2 Drawing Sheets

METHOD FOR ELECTROMAGNETIC ACTUATOR WITH MOLDED CONNECTOR

This application claims the benefit of U.S. Provisional Application Ser. No. 60/090,888, filed on Jun. 26, 1998.

FIELD OF THE INVENTION

This invention relates to an electromagnetic actuator for a vehicle engine and, more particularly, to an electromagnetic actuator having a molded connector providing a connection for electrical energy to the actuator.

BACKGROUND OF THE INVENTION

A conventional electromagnetic actuator for opening and closing a valve of an internal combustion engine generally includes "open" and "close" electromagnets which, when energized, produce an electromagnetic force on an armature. The armature is biased by a pair of identical springs arranged in parallel. The armature is coupled with a gas exchange valve of the engine. The armature rests approximately half-way between the open and close electromagnets when the springs are in equilibrium. When the armature is held by a magnetic force in either the closed or opened position (at rest against the open or close electromagnet), potential energy is stored by the springs. If the magnetic force is shut off with the armature in the opened position, the spring's potential energy will be converted to kinetic energy of the moving mass and cause the armature to move towards the close electromagnet. If friction is sufficiently low, the armature can then be caught in the closed position by applying current to the close electromagnet.

Typically, providing a connection for electrical energy to the actuator is accomplished by using a plastic connector joined directly to a surface of the metal actuator by a high pressure overmolding process. However, this connection is not robust since it is difficult to create a strong joint between the plastic connector and the flat metal surface of the actuator.

Accordingly, a need exists to join a plastic connector to a surface of a metal actuator such that a robust connection is created between the metal actuator and plastic connector.

SUMMARY OF THE INVENTION

An object of the present invention is to fulfill the need referred to above. In accordance with the principles of the present invention, this objective is obtained by providing a method of joining a connector to an electromagnetic actuator. The actuator has a metal housing structure and electrical leads extending from the housing structure. The method includes providing at least one channel in the housing structure and a port communicating with the at least one channel and with a mounting surface of the housing structure. The plastic connector is molded on the mounting surface and plastic material in fluid form is permitted to flow through the port and into the at least one channel to fill the channel and the port. The plastic material is permitted to cool and harden to define the connector with the connector being interlocked with respect to the housing structure via the plastic material in the at least one channel.

In accordance with another aspect of the invention, an electromagnetic actuator is provided and includes housing structure having a mounting surface and at least one channel therein generally adjacent to the mounting surface. An upper electromagnet and a lower electromagnet are provided in the housing structure and are disposed in spaced relation. Each of the upper and lower electromagnets has electrical leads. An armature is mounted for movement between the upper and lower electromagnets. A connector is joined with the mounting surface and has a portion extending into the at least one channel so as to interlock the connector with the housing structure. The connector also covers at least a portion of the leads.

Other objects, features and characteristic of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

DETAILED DESCRIPTION OF THE INVENTION

Figure 1:
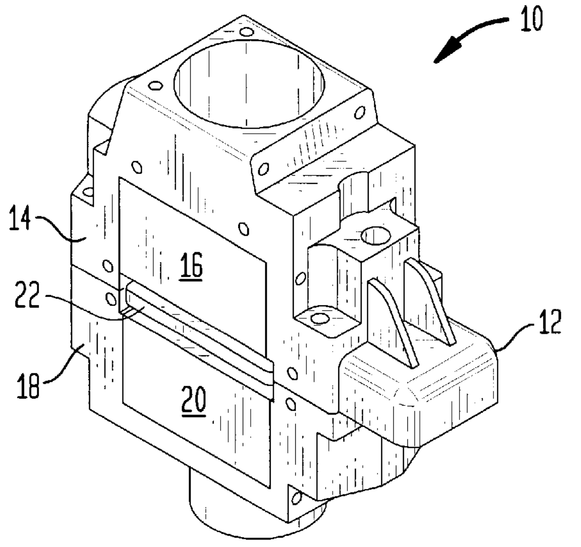
FIG. 1 a perspective view of an electromagnetic actuator having a plastic electrical connector provided in accordance with the principles of the preset invention.

Referring to FIG. 1, a perspective view of an electromagnetic actuator is shown, generally indicated 10, including an electrical connector 12 provided in accordance with the principles of the present invention. The electromagnetic actuator 10 comprises housing structure including an upper housing 14 containing an upper electromagnet 16 therein and a lower housing 18 containing a lower electromagnet 20. An armature 22 is arranged for movement between the electromagnets 16 and 20. The upper and lower housings are preferably made of aluminum or other metals. The armature 22 is associated with shaft structure (not shown) which may be coupled to a gas exchange valve of a vehicle engine. In the typical manner, a pair of opposing springs (not shown) are associated with the armature 22 to move the armature between the upper and lower electromagnets. The upper electromagnet 16 is powered at leads 24 and the lower electromagnet 20 is powered at leads 26.

Figure 2:
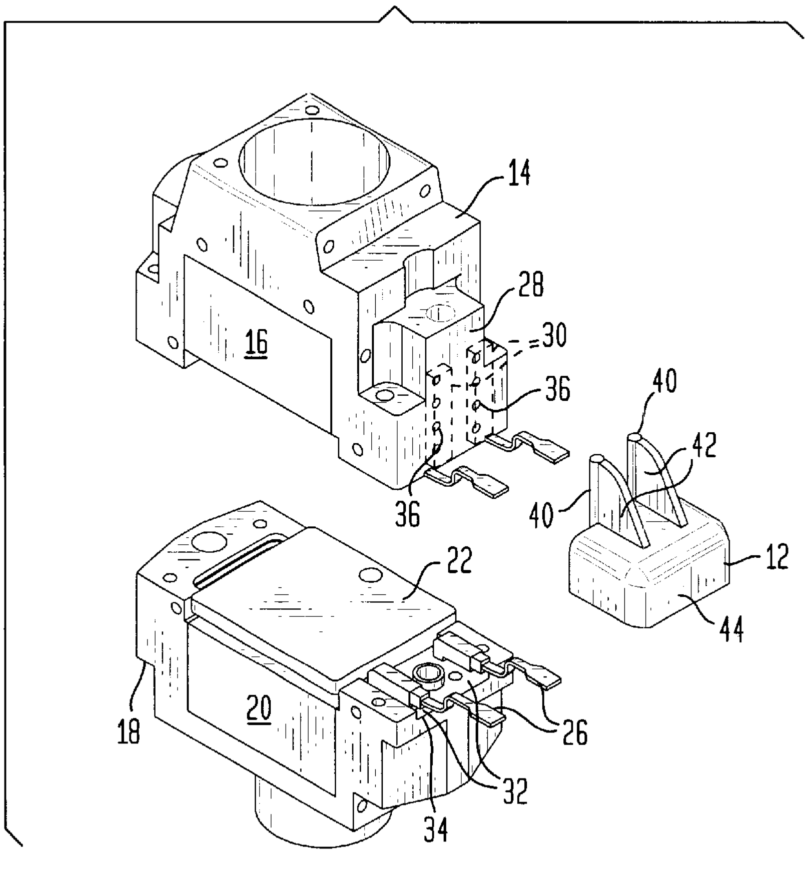
FIG. 2 is an exploded view of the electromagnetic actuator of FIG. 1.
Figure 3:
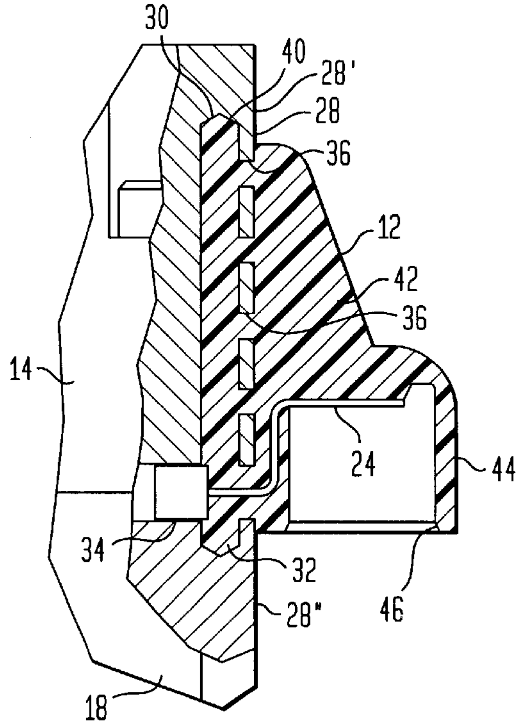
FIG. 3 is an enlarged cross-sectional view of the connector-actuator joint of the electromagnetic actuator of FIG. 1.

In accordance with the principles of the present invention, a plastic connector 12 is molded over the upper surfaces of the leads 24 and 26 and is joined to the upper housing 14 and lower housing 18 of the actuator 10. The plastic material is preferably glass-filled nylon or other similar plastic material. In order to ensure a robust joint between the flat metallic mounting surface 28 (FIG. 3) of the housing structure, at least one plastic receiving channel 30 is defined in the upper housing 14 generally adjacent to a mounting surface 28. The mounting surface 28 is defined by cooperating planar surfaces 28';

and 28" of the upper and lower housing, respectively. In the illustrated embodiment, two channels 30 are provided in the upper housing 14 in spaced relation, as best shown by the dashed lines in FIG. 2. With reference to FIGS. 2 and 3, each of the channels 30 communicates with a recess 32 defined in upwardly facing surface 34 of the lower housing 18, the function of which will become apparent below.

At least one fill port 36 is provided in the mounting surface 28 to communicate with each channel 30 such that during molding of the connector 12, plastic material in fluid form may flow through the fill port and fill the associated channel 30. The port 36 is disposed generally transverse with respect to the associated channel 30. In the illustrated embodiment, a plurality of fill ports 36 are associated with each channel 30.

Figure 4:
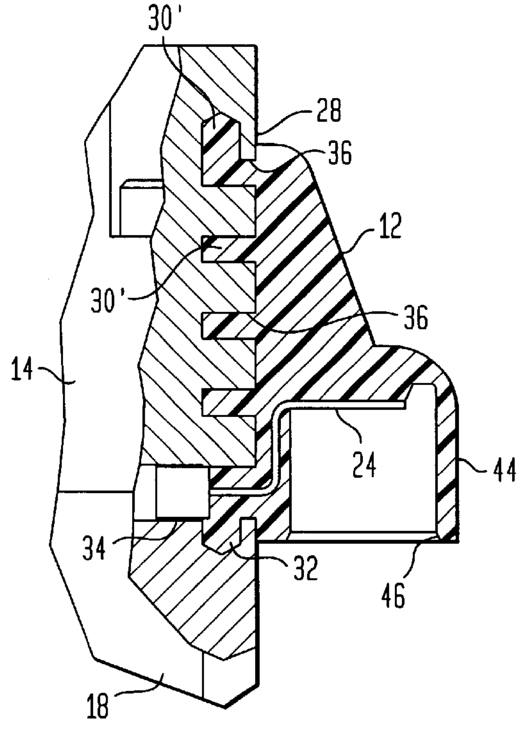
FIG. 4 is an enlarged cross-sectional view of a second embodiment of a connector-actuator joint of the electromagnetic actuator of the invention.

Although continuous, elongated, vertically extending channels 30 are shown in FIGS. 2 and 3, with reference to FIG. 4, it can be appreciated that the channels 30' may be an extension of each fill port 36 and each channel need not be in communication with another channel 30'. In FIG. 4, like reference numerals with respect to FIG. 3 indicate like parts of the invention.

It is preferable to cast the upper and lower housings, and during the casting process, to define the channels and recesses with negative draft.

During the molding process for creating the connector 12, a mold is provided to define the connector 12 and molten plastic is directed to the mold. Plastic flows into the fill ports and fills the channels 30 and the recesses 36 and the fill ports 36. Once the plastic is allowed to cool, the plastic material in the recesses 36 and channels 30 interlocks the connector 12 with the upper housing 14 and with the lower housing 18. FIG. 3 shows the plastic material in the recess 32 and channel 30. FIG. 2 shows the connector 12 in an exploded view, with the plastic material indicated at 40 being the material which fills the channels 30.

The connector 12 includes a pair of gussets 42 extending from a body portion 44 thereof. The body includes an opening 46 (FIG. 3) so as to gain access to the underside of each lead 24 and 26 to provide power to the actuator 10 by pressure contact with a cable rail (not shown) mounted on the cylinder head of an engine. The gussets 42 provide support for loads exerted on the connector 12 which may be caused by the cable rail pressure contact with the leads 24 and 26, by thermal expansion, by vibration, etc. As shown, each gusset 42 is disposed generally adjacent to a channel 30 so that sufficient plastic material is provided to make the housing structure-connector joint robust.

It can be appreciated that the connector 12 of the invention is joined securely to the actuator 10 due to the channels 30 and recesses 32 in the housing structure, is easy to manufacture, and has low manufacturing costs.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A method of joining a connector to an electromagnetic actuator, the actuator having a metal housing structure and electrical leads extending from the housing structure, the method including:

providing at least one channel in said housing structure and a port communicating with said at least one channel and with a mounting surface of said housing structure, molding a plastic connector about the leads, so as to completely cover at least one surface of the leads, and on said mounting surface, and permitting plastic material in fluid form to flow through said port and into said at least one channel to fill said at least one channel and said port, and permitting said plastic to cool and harden to define said connector with said connector being interlocked with respect to said housing structure via the plastic material in said at least one channel, with the connector covering and thereby preventing access to said at least one surface of said leads.

2. The method according to claim 1, wherein two channels are provided in said housing, each said channel having a port communicating therewith, the method including permitting said plastic material to flow through each said port and into an associated channel.

3. The method according to claim 1, wherein said housing structure is casted and said channel is provided in said housing structure so as to have negative draft.

4. The method according to claim 1, wherein the molding step includes molding glass-filled nylon.

5. The method according to claim 1, wherein the molding step includes providing an opening in the connector so as to gain access to a surface of said leads opposite said one surface.

6. The method according to claim 2, wherein the molding step includes defining the connector to have a body and a pair of gussets extending from said body, said gussets being generally adjacent to said channels.

* * * * *